(12) United States Patent
Richardson et al.

(10) Patent No.: US 8,635,525 B2
(45) Date of Patent: Jan. 21, 2014

(54) SYSTEMS, METHODS AND COMPUTER READABLE MEDIA FOR CREATING AND UPDATING ELECTRONIC DOCUMENTS

(75) Inventors: Debra Richardson, Greenwood, IN (US); Debra A. Johnston, St. Louis, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 542 days.

(21) Appl. No.: 12/615,684

(22) Filed: Nov. 10, 2009

(65) Prior Publication Data
US 2011/0113325 A1    May 12, 2011

(51) Int. Cl.
*G06F 17/00* (2006.01)

(52) U.S. Cl.
USPC ............................ 715/253; 715/255; 715/256

(58) Field of Classification Search
USPC .................. 715/209, 222, 234, 255, 253, 256
See application file for complete search history.

(56) References Cited

U.S. PATENT DOCUMENTS

| | | | | |
|---|---|---|---|---|
| 7,302,433 B2* | 11/2007 | Kalmick et al. | ............ | 707/694 |
| 7,664,655 B2* | 2/2010 | Rosenthal et al. | ............ | 705/1.1 |
| 7,984,053 B2* | 7/2011 | Jackson et al. | ............ | 707/736 |
| 8,180,042 B2* | 5/2012 | Lew et al. | ............ | 379/265.02 |
| 2007/0203935 A1* | 8/2007 | de Souza | ............ | 707/102 |
| 2008/0183515 A1* | 7/2008 | Chheda et al. | ............ | 705/7 |
| 2009/0158421 A1* | 6/2009 | Hunt | ............ | 726/17 |
| 2010/0095202 A1* | 4/2010 | Ishizuka | ............ | 715/255 |
| 2010/0287188 A1* | 11/2010 | Kakar | ............ | 707/769 |

OTHER PUBLICATIONS

Katherine Murray, Master Headers and Footers in Word 2007 documents, 2013, Microsoft.*

* cited by examiner

*Primary Examiner* — Stephen Hong
*Assistant Examiner* — Matthew Ludwig
(74) *Attorney, Agent, or Firm* — Hartman & Citrin LLC

(57) ABSTRACT

Methods, systems, and computer-readable media for preparing for creating and updating electronic documents are provided. According to one aspect, a method for updating electronic documents having a first section of information includes receiving an update to the first section of information and parameters associated with the electronic documents to be updated. Upon receiving the update to the first section of information and receiving the parameters associated with the electronic documents to be updated, the electronic documents including the updated first section of information and the parameters associated with the electronic documents are automatically updated.

16 Claims, 6 Drawing Sheets

| Line No | Data | Text/Label | Compnt Type | Optional Ind | Print Ind | Online Ind | Textbox Length | Operation |
|---|---|---|---|---|---|---|---|---|
| C1 | STD | *Approvals | text | N | Y | Y | 0 | View & Edit |
| C2 | STD | *Completed By Name: | textbox | N | Y | Y | 40 | View & Edit |
| C3 | STD | *Completed By ATTUID: | textbox | N | Y | Y | 6 | View & Edit |
| C4 | STD | *Completed By Phone Number (NPA-NNX-L | textboxPhone | N | Y | Y | 12 | View & Edit |
| C5 | RD | *Business Unit: | dropdown | N | Y | Y | 0 | View & Edit |
| C6 | STD | *Pricing Product Manager: | textbox | Y | Y | Y | 40 | View & Edit |
| C7 | STD | *Resale Product Manager: | textbox | Y | Y | Y | 40 | View & Edit |
| C8 | STD | *Product/Market Manager: | textbox | Y | Y | Y | 40 | View & Edit |
| C9 | STD | *Regulatory Contact: | textbox | Y | Y | Y | 40 | View & Edit |
| C10 | STD | *Network Manager: | textbox | Y | Y | Y | 40 | View & Edit |

*Fig. 3*

SYSTEMS, METHODS AND COMPUTER READABLE MEDIA FOR CREATING AND UPDATING ELECTRONIC DOCUMENTS

TECHNICAL FIELD

Exemplary embodiments are related to creating and updating electronic documents. More particularly, exemplary embodiments relate to creating and updating electronic documents including common sections and unique sections.

BACKGROUND

Documents are an integral part of many companies and maintaining the accuracy and consistency throughout the documents is important to avoid any confusion that may arise due to inconsistencies throughout the documents. A document may include sections of information that are common to some or all of the documents used by a company. Presently, in order to update a common section in all of the documents, each document needs to be updated individually, which becomes costly and time consuming if there are a large number of documents. Further, when updating a large number of documents individually, there is a greater risk of introducing errors, making the updating process unreliable.

Existing software solutions, such as Hotdocs, attempt to automate editing documents, but have met limited or no success. Hotdocs allows the creation of a document using interactive templates. However, Hotdocs is not capable of producing multiple documents containing common sections and unique sections.

It is with respect to these and other considerations that the disclosure made herein is presented.

SUMMARY

Embodiments of the disclosure presented herein include methods, systems, and computer-readable media for creating and updating electronic documents. According to one aspect, a method for updating electronic documents having a first section of information includes receiving an update to the first section of information. Upon receiving the update to the first section of information, the documents are automatically updated.

According to another aspect, a system for updating documents including a first portion and a second portion is provided. The system includes a memory and a processor functionally coupled to the memory. The memory stores a program containing code for generating and updating documents. The processor is responsive to computer-executable instructions contained in the program and configured to receive a first section of information in a first format and second sections of information in a second format. Documents are created in a third format, and a portion of the documents includes a combination of the first section of information and at least one of the second sections of information. An update to the first section of information is received, and in response to receiving the update to the first section of information, at least one of the portions of the documents including the combination of the first section and the second section is automatically updated.

According to yet another aspect, a computer-readable medium having instructions stored thereon for execution by a computer causes the computer to receive an update to a first section of information included on a plurality of documents. Upon receiving the update to the first section of information, the plurality of documents including the first section is automatically updated.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 3 illustrates an exemplary table containing common sections of information, according to various embodiments

DETAILED DESCRIPTION

Figure 1:
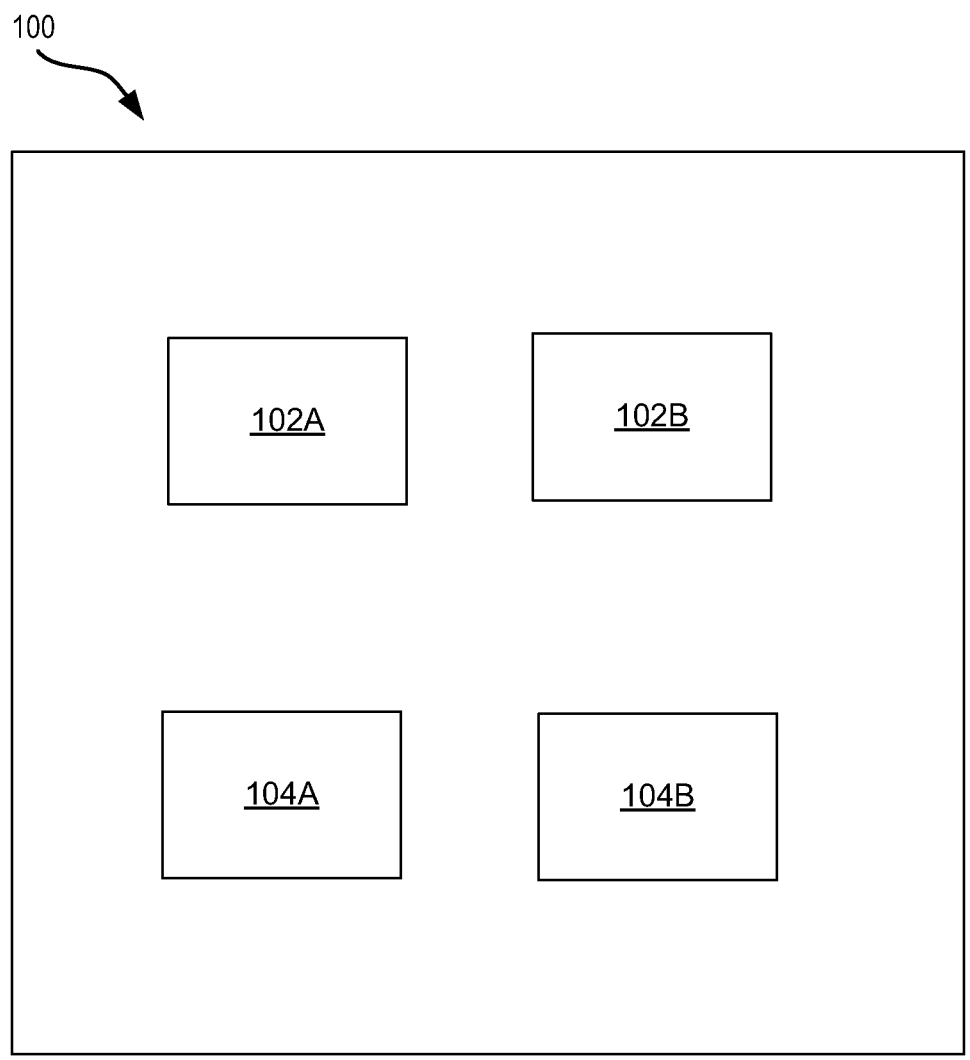
FIG. 1 illustrates an exemplary electronic document, according to various embodiments.

The following detailed description is directed to methods, systems, and computer-readable media for creating and updating electronic documents. According to exemplary embodiments, the present disclosure describes systems, methods, and computer-readable media for creating an electronic document by receiving one or more common sections of information in a first format and one or more unique sections of information in a second format and combining the common and unique sections of information to create the electronic document in a third format. In accordance with further embodiments, the common sections of the electronic document are found in more than one of the created electronic documents, and the unique sections of the electronic document are unique to each of the created electronic documents. The common sections and the unique sections of information may include any type of data including, but not limited to, text, spreadsheets, and images. For instance, the common sections of information may include a company's name and address, a billing rate for a state or a region, a disclaimer statement, and tariff information, amongst others. The unique sections of information may include the name and address of a particular client, the service termination date, and the client's individual billing rate, amongst others.

Through the implementation of the present disclosure, the electronic documents including one or more common sections of information may be updated automatically when an update to one or more of the common sections of information is received, without having to individually update each of the electronic documents that include the updated common sections of information. When an update to a common section of information is received, electronic documents that include the common section of information may be automatically updated without having to access and update the electronic documents individually. According to exemplary embodiments, the common sections of information also include a selection parameter that identifies which electronic documents include the particular common section of information. In this way, when an update to the common section of information is received, only those documents that are selected by the selection parameter are updated accordingly.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. Referring now to the drawings, like numerals will represent like elements through the several figures. For the sake of ease of understanding, details pertaining to embodiments of the present disclosure will be explained by way of specific examples.

FIG. 1 illustrates an electronic document 100, according to embodiments described herein. The electronic document 100 may be a fillable form, information document, or any other document. The electronic document 100 may include one or more common sections of information, such as common sections of information 102A-102B, which include information that is common to more electronic documents than just the electronic document 100. For instance, the common sections of information 102A-102B may represent a company logo, a company's name and address, a standard billing rate for a state or a region, a disclaimer statement, a list of states and tariff information, amongst others. In this way, if a common section of information, such as the common section of information 102A is updated, any electronic document including the common section of information 102A may automatically be updated without having to individually update each electronic document including the common section of information 102A. Common sections of information included in electronic documents, like the electronic document 100, may be stored in tables, as discussed further in regard to FIGS. 2 and 3.

The electronic document 100 may also include one or more unique sections of information, such as unique sections of information 104A-104B, which includes information that is unique to the electronic document 100. In some embodiments, portions of information in the unique sections of information 104A-104B may also be present in other documents but are not included in the common sections 102A-102B. As described above, the unique sections of information 104A-104B may include the name and address of a particular client, the service termination date, and the client billing rate, amongst others. Unique sections of information, like the unique sections of information 104A-104B, may be stored in a database, an embodiment of which is described in FIG. 2.

It should be appreciated by those skilled in the art that the electronic documents may be presented to a user via the user interface application. The user interface application may be able to display help information, menus, buttons and icons, amongst others along with the common and unique sections of information that are a part of the electronic documents.

Figure 2:
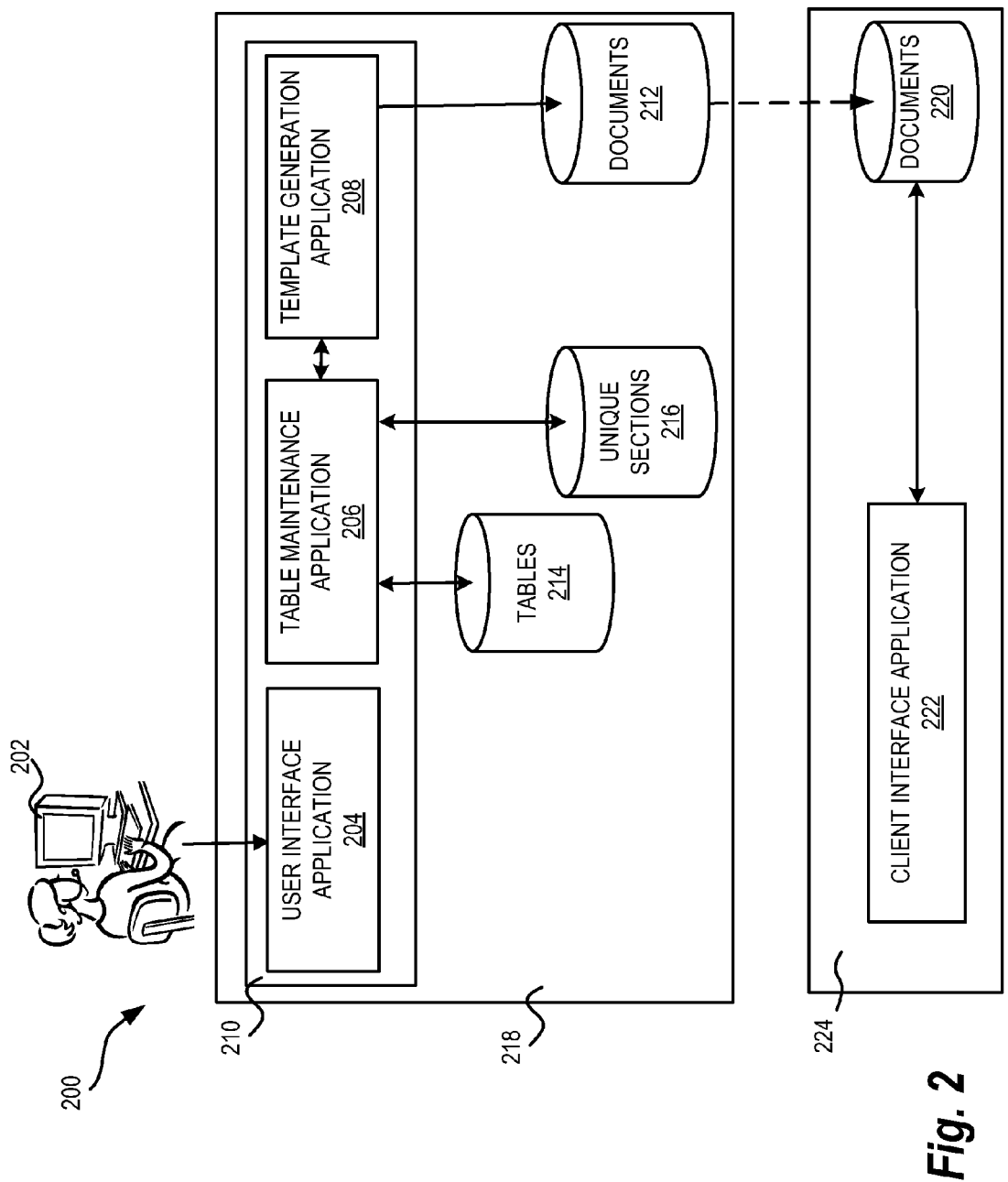
FIG. 2 illustrates an operating environment for creating and updating documents, according to various embodiments.

Turning now to FIG. 2, an operating environment 200 for creating and updating electronic documents, such as the electronic document 100 described in regard to FIG. 1, is illustrated. According to exemplary embodiments, the operating environment 200 includes a certification system 218 and a production system 224. The certification system 218 may include a document processing program 210 that includes various applications and modules, including a user interface application 204, a table maintenance application 206 and a template generation application 208.

A user 202 may interact with the user interface application 204 of the document processing program 210 to request that a new electronic document be created or that an existing electronic document, such as the electronic document 100, be updated by updating one or more sections of information associated with the electronic document 100, such as the common sections of information 102A-102B. The user interface application 204 may provide a graphic user interface accessible to the user 202, which may allow the user 202 to access the document processing program 210 from any local or remote computer system having access to the document processing program 210. According to embodiments, the user 202 may request to update one or more sections of information of the electronic document 100 via the user interface application 204. The user interface application 204 may provide the user 202 with options to select at least one of the common sections of information 102A-102B to update. According to further embodiments, each common section of information may optionally include a selection parameter that indicates which electronic documents are to be updated. If a common section of information is configured to be included in all the electronic documents, the common section of information is a required common section and therefore the selection parameter indicates that the common section is to be included in all the electronic documents. However, if the common section of information is an optional common section, the common section of information includes a selection parameter that may be updated by the user 202 via the user interface application 204, such that the user 202 may select which electronic documents to update.

Further, the user interface application 204 may be configured to receive security credential information and scheduling information from the user 202, details of which are described below in regard to the table maintenance application 206. In addition, the user interface application 204 or any other interface application may be configured to display the electronic documents on a screen in a viewable format, which may include the first section of information, the second section of information and other various features, such as menu buttons, menu options and help information. These sections of information as well as the various features displayed by the user interface application may be stored as separate files within in a documents database, as will be described below. It should be appreciated that the electronic document may be a JAVA server page file that includes XML, HTML and JAVA script files.

The table maintenance application 206 may be configured to maintain a set of tables, such as tables 214, containing the common sections of information that are common to more than one electronic document. The tables 214 may be stored as Oracle tables, in a database that is associated with the certification system 218 or that is in communication with the certification system via a network. According to exemplary embodiments, the common sections of information are stored in a format that is compatible with the Oracle tables 214.

As discussed above, the table maintenance application 206 may be used to administer and schedule document update releases according to an update schedule received from the user 202. Upon receipt of the update schedule, the table maintenance application 206 may set a specific time corresponding to the update schedule for the update to the electronic documents, including the updated common section of information, to occur. In this way, updates to electronic documents that are time sensitive may be made at a specific time as desired by the user 202.

According to embodiments, updates to the electronic documents may be made once a request is made by the user, but may not be accessible to clients until the electronic documents are moved from the certification system 218 to the production system 224 using a batch program. The batch program may be a part of the document processing program 210, or may be in communication with the document processing program 210 and may be configured to move the plurality of electronic documents from the certification system 218 to the production system 224 according to a release schedule.

The table maintenance application 206 may also include tables that contain security credential information of various users, which may include unique user identity information and the level of security access provided to each particular user. When a request is received from a user, the table maintenance application 206 may access the security credential information to determine if the user's identity information matches the unique user identity information, and if so, whether the user is authorized to perform the request being requested. Thus, the document processing program 210 protects the electronic documents from being altered by unauthorized users.

The template generation application 208 of the document processing program 210 may be configured to create a new electronic document or update existing electronic documents that may have been previously created by the document processing program 210. According to embodiments, the template generation application 208 utilizes the common sections of information contained in the set of tables 214 maintained by the table maintenance application 206 and the unique sections of information received by the user and stored in a unique sections database 216 to create an electronic document. The unique sections database 216 may be associated with the certification system 218 or in communication with the certification system via a network.

Further, the template generation application 208 may be configured to update existing documents that may have been previously created by the document processing program 210. Details regarding how electronic documents may be updated will be described below in regard to FIG. 5. It should be appreciated that the electronic documents may be stored in a documents database 212 which may be associated with the certification system 218 or in communication with the certification system via a network. According to embodiments, the documents database 212, the tables database 214 and the unique sections database 216 may be stored in a single database that is accessible to the document processing program 210. Once the electronic documents that are requested to be created or updated have been created or updated by the document processing program 210, the document processing program 210 may move these newly created or updated electronic documents from the documents database 212 of the certification system 218 to a documents database 220 of the production system 224 for access by a larger number of users via an interface provided by a client interface application 222 over a network, for example.

Referring now to FIG. 3, a table 300 containing the common sections of information stored in the tables database 214 is shown. The table 300 includes a plurality of common sections of information, such as common sections 302A and 302B. The table 300 stores information relevant to the common sections, such as a label field 306, an optional indicator field 308, and a properties field 310 that contains further information relevant to the common section. The label field 306 may be used to describe the purpose of the common section. For instance, as shown in FIG. 3, the common section 302A is labeled Business Unit indicating that this common section 302A pertains to the Business Unit utilizing the electronic document Further, the common section 302B is labeled Pricing Product Manager indicating that the common section 302B may be related to the name or identity of the pricing product manager associated with the electronic document.

As described above, the common sections may be required or optional common sections. Required common sections are present in every electronic document, while optional common sections may not be present in every electronic document. The optional indicator field 308 indicates whether the common section of information is a required common section or an optional common section. For example, according to the table 300 shown in FIG. 3, common section 302A is a required common section, while common section 302B is an optional common section.

The properties field 310 shown in FIG. 3 contains additional details regarding the common sections. For instance, when the properties field 310 is accessed, details such as the text of the common section, the list of electronic documents in which the common section is included, and the help description related to the common section are included. In this way, the user 202 may edit and update the details of the common section using the properties field 310. For instance, as described above, section 302B is an optional common section that is to be included in some but not all of the electronic documents. The user may change the text of the common section 302B or remove the common section 302B from electronic documents by changing the properties field of the common section 302B.

Figure 4:
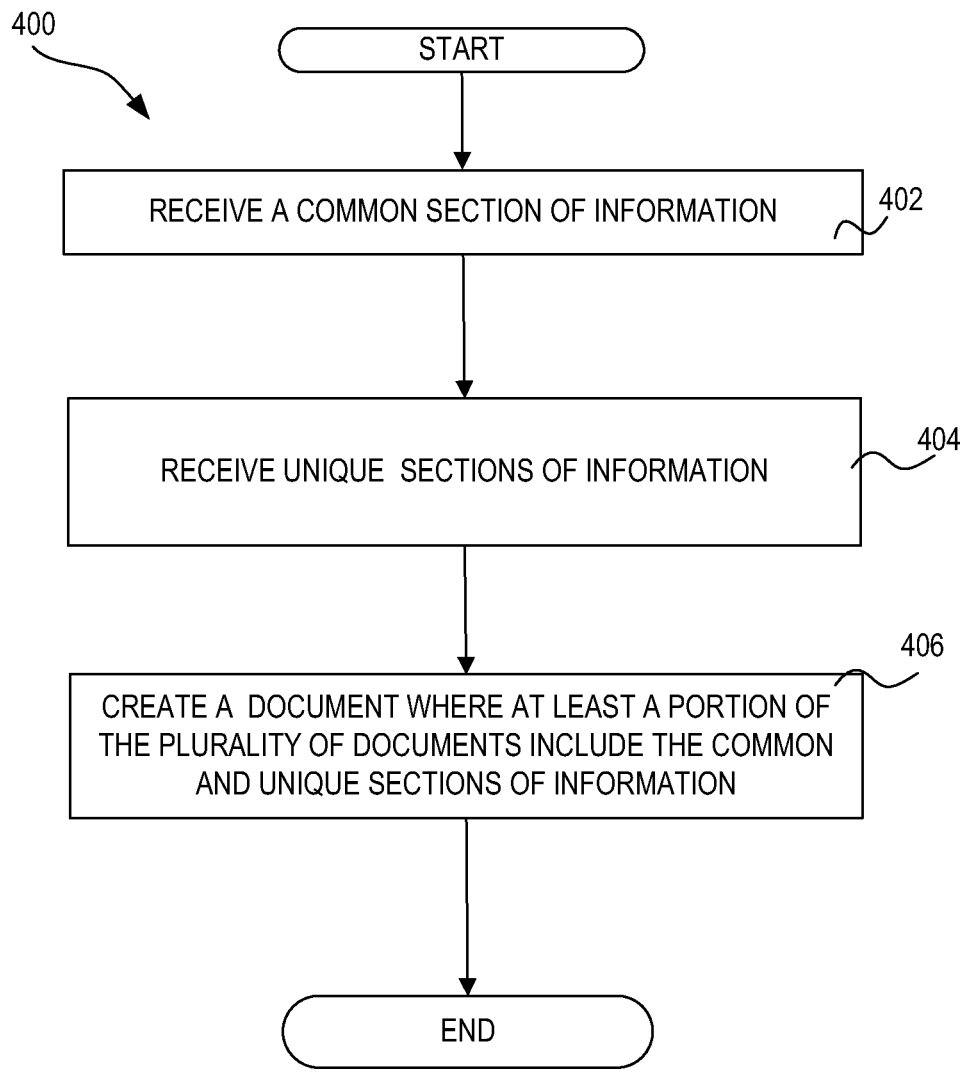
FIG. 4 is a logical flow diagram illustrating aspects of a process for creating documents, according to various embodiments.
Figure 5:
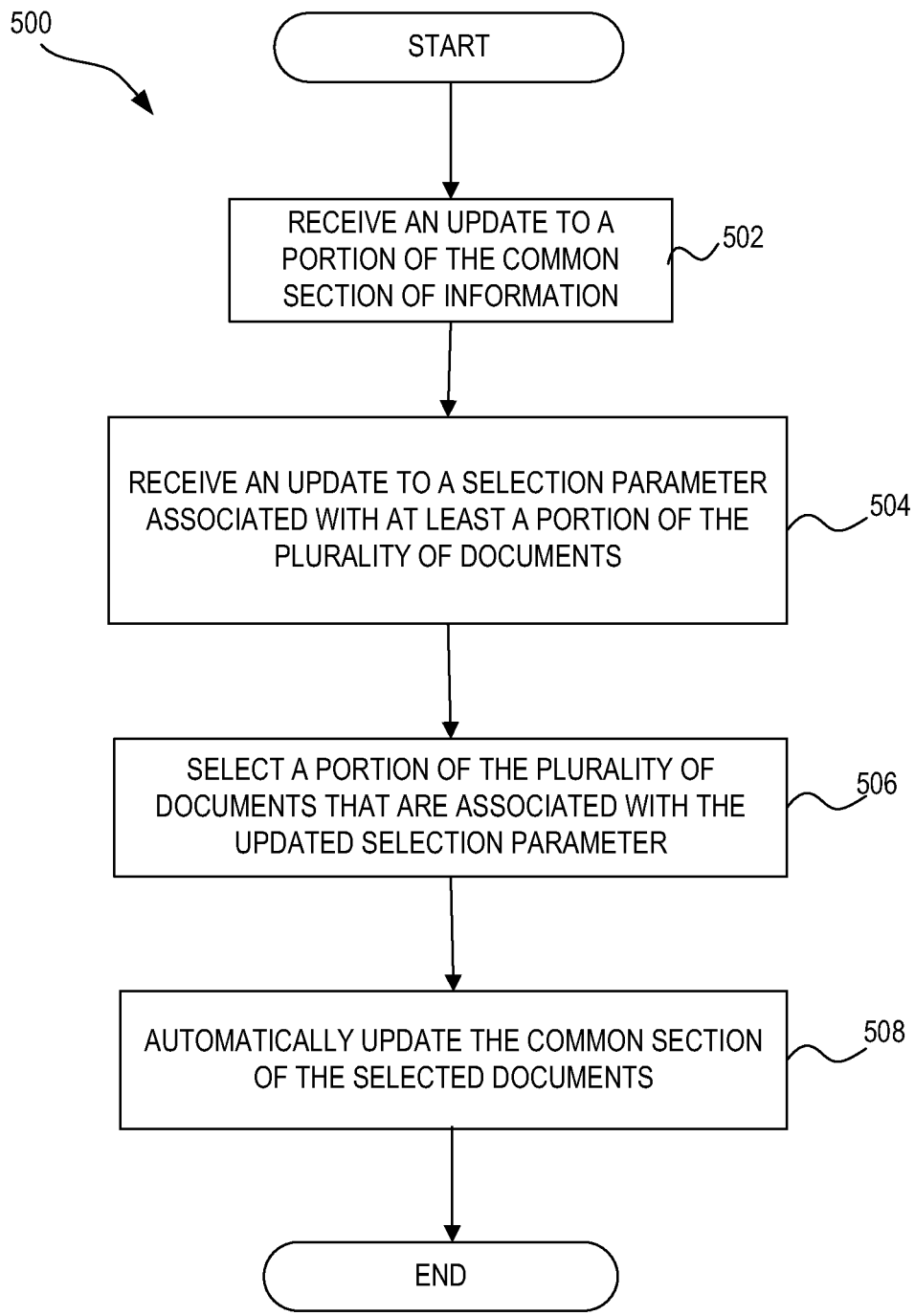
FIG. 5 is a logical flow diagram illustrating aspects of a process for updating documents, according to various embodiments.

Turning now to FIGS. 4 and 5, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring now to FIG. 4, additional details for creating a new electronic document will be provided according to embodiments of the present disclosure. In particular, FIG. 4 is a flow diagram illustrating a routine 400 for creating a new electronic document. The routine 400 begins at operation 402, where the document processing program 210 receives a common section of information, such as the common section of information 102A, from the tables 214. According to embodiments, the common section of information 102A may include information that is common to more than one electronic document stored in the documents database 212. As described above in regard to FIG. 3, the user 202 may submit at least one common section including information selecting electronic documents in which to include the particular common section.

From operation 402, the routine 400 proceeds to operation 404, where the document processing program 210 receives a unique section of information, such as the unique section of information 104B, from the unique sections database 216. The unique section of information 104B may include information that is unique to the electronic document. The unique sections of information may be stored in the unique sections database 216 as files in the DOC, PDF or EXCEL format.

From operation 404, the routine 400 proceeds to operation 406, where the document processing program 210 creates an electronic document by combining the common section of information 102A and the unique section of information 104B. The document processing program 210 may create a plurality of electronic documents using the common section of information 102A alone, the unique section of information 104B alone, or any combination of the common section 102A and other common sections of information stored in the tables 214 along with the unique section of information 104B and other unique sections of information stored in the unique sections database 216. According to exemplary embodiments, the template generation application 208 may merge the common section of information 102A and the unique section of information 104B to create an electronic document, which is presented to a user in a JAVA server page format. For instance, if the electronic document is a fillable form, instructions for filling out the fillable form may appear on the electronic document by hovering a cursor over certain areas of the document. These instructions and other portions of the electronic document may be stored as corresponding DOC, HTML or XML files in the documents database 216. In order to present the electronic document to a user, such as the user 202, the user interface application 204 collects the appropriate files stored in the documents database that are associated with the particular electronic document, and presents the electronic document in the JAVA server page format, including the common sections and the unique sections in their respective file formats, which may be DOC, PDF or EXCEL file formats. From operation 406, the routine 400 ends.

According to embodiments, once the electronic document has been created using the document processing program 210, the document processing program 210 may send the electronic document for review to a client and/or user requesting the document. Upon receiving approval from the user and/or the client, the electronic document may be moved from the certification system 218 to the production server 224 using a batch program, so that the electronic document is accessible by clients via the client interface application 222.

Referring now to FIG. 5, additional details for updating at least one previously created electronic document will be provided, according to embodiments of the present disclosure. FIG. 5 is a flow diagram illustrating a routine 500 for updating at least one previously created electronic document. For example, embodiments of the present disclosure may be utilized by a telecommunications company providing telephone service to clients across the United States of America. The telecommunications company may utilize embodiments of the present disclosure to update documents including a common disclosure statement pertaining to tariffs for customers for which an update is required. The routine 500 begins at operation 502, where the document processing program 210 receives a request from an authorized user for updating documents containing a common section of information, such as the common section of information 102B, for which an update is to be made. For example, the common section of information 102B may include a disclosure statement pertaining to tariffs for customers. According to exemplary embodiments, the request includes an updated disclosure statement pertaining to tariffs. In addition, the request may indicate that the updated common section of information 102B is to replace the previous common section of information, which is indicated to be common among a portion of the electronic document stored in the documents database 212.

From operation 502, the routine 500 proceeds to operation 504, where a selection parameter associated with the portion of electronic documents to be updated is also received by the document processing program from the authorized user. According to the example described herein, the selection parameter includes unique identifiers associated with each of the electronic documents including the updated common section of information. A unique document identifier may be a reference number that uniquely identifies a particular electronic document stored within the documents database 212.

From operation 504, the routine 500 proceeds to operation 506, where the document processing program 210 creates a new common section that includes the updated disclosure statement pertaining to tariffs. In the properties field, the user 202 may include the unique identifiers associated with the electronic documents that are to include the common section associated with the updated disclosure statement. Once the new common section is added, the common section including the previous disclosure statement needs to be updated. Therefore, the user 202 may access the properties field of the previous common section and remove the electronic documents that no longer need the previous disclosure statement. In this way, only those documents that are selected to include the updated disclosure statement are associated with the updated disclosure statement common section and those documents that were to include the previous disclosure statement remain associated with the previous common section. Once the user 202 creates the new common section, the document processing program 210 selects the electronic documents based on the selection parameter associated with the updated common section. According to embodiments, those electronic documents whose unique identifiers are included within the selection parameter associated with the updated common section are selected to be updated.

From operation 506, the routine 500 proceeds to operation 508, where the template generation application 208 automatically and uniformly updates the selected portion of electronic documents determined by the document processing program 210 to be associated with the selection parameter and to include the updated common section of information. According to embodiments, the template generation application 208 may update each of the selected documents using a method similar to the method described in FIG. 4 by combining the updated common section of information, such as the updated disclosure statement pertaining to tariffs of information, with any other common and/or unique portions of information originally included in each of the selected documents. When at least one common section of information is updated for those documents including the common section of information, the updated common section of information may be stored as a new common section of information and may be associated with new selection parameters, such that the updated documents may be updated according to the selection parameters associated with the new common section of information. From operation 508, the routine 500 ends.

Figure 6:
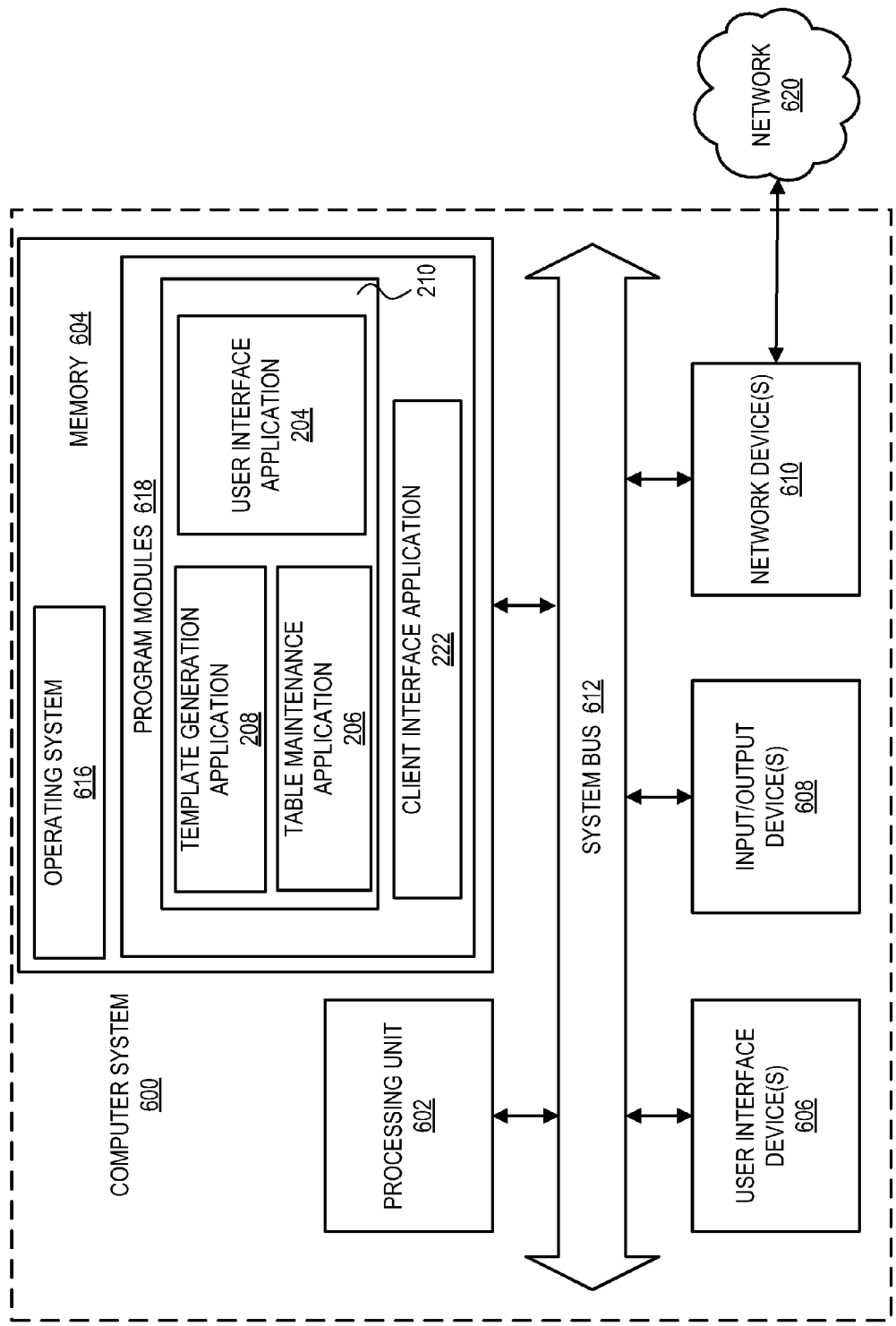
FIG. 6 is a block diagram illustrating an exemplary computer system configured to create and update documents, according to various embodiments.

FIG. 6 is a block diagram illustrating a computer system 600 configured to create and update documents having common sections of information, in accordance with embodiments. Examples of the computer system 600 may include the certification system 218 and the production system 224. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 604 communicates with the processing unit 602 via the system bus 612. In one embodiment, the memory 604 is operatively connected to a memory controller (not shown) that enables communication with the processing unit 602 via the system bus 612. The memory 604 includes an operating system 616 and one or more program modules 618, according to exemplary embodiments. Examples of operating systems, such as the operating system 616, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. Examples of the program modules 618 include the client interface application 222 and the document processing program 210 which includes the user interface application 204, the table maintenance application 206 and the template generation application 208. In some embodiments, the program modules 618 are embodied in computer-readable media containing instructions that, when executed by the processing unit 602, performs embodiments of the routine 400 for creating electronic documents and routine 400 for updating electronic documents, as described in greater detail above with respect to FIGS. 4 and 5. According to embodiments, the program modules 618 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 618. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network 620. Examples of the network devices 610 may include, but are not limited to, a modem, a radio frequency ("RF") or infrared ("IR") transceiver, a telephonic interface, a bridge, a router, or a network card. The network 620 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 620 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for updating documents, the method comprising:

receiving, at a processor, an update to a first section of information, the update comprising changes to text of the first section of information;

determining, by the processor, that both a first document and a second document comprise the first section of information, wherein the first document further comprises a second section of information unique to the first document and the second document further comprises a third section of information unique to the second document;

receiving, by a processor, a selection parameter associated with the first document and the second document, the selection parameter indicating that the first document and the second document comprise the first section of information to be updated by the update;

in response to receiving the update to the first section of information, simultaneously updating, by the processor, the first document and the second document to replace the first section of information of both the first document and the second document with an updated first section of information comprising updated text based on the update received to create an updated first document and an updated second document; and determining, by the processor, to update the first document and the second document with the updated first section of information based on the first document and the second document being associated with the selection parameter.

2. The method of claim 1, wherein the updated first section of information is associated with a first format; the second section of information and the third section of information are associated with a second format; and the updated first document and the updated second document are associated with a third format.

3. The method of claim 2, wherein the first format is at least one of a HyperText Markup Language (HTML) format or an Extensible Markup Language (XML) format; the second format is at least one of a document (DOC) format, a Portable Document Format (PDF), or an EXCEL format; and the third format is a JAVA server page format.

4. The method of claim 1, wherein simultaneously updating the first document and the second document occurs according to a schedule.

5. The method of claim 1, further comprising moving the updated first document and the updated second document from a first system to a second system using a batch program.

6. The method of claim 1, further comprising:
determining that a third document comprises the first section of information; and
determining not to update the third document with the updated first section of information based on the third document not being associated with the selection parameter.

7. A system for updating documents, the system comprising:
a processor; and
memory coupled to the processor, the memory comprising instructions that, when executed by the processor, cause the processor to perform operations comprising
receiving an update to a first section of information, the update comprising changes to text of the first section of information,
determining that both a first document and a second document comprise the first section of information, wherein the first document further comprises a second section of information unique to the first document and the second document further comprises a third section of information unique to the second document,
receiving a selection parameter associated with the first document and the second document, the selection parameter indicating that the first document and the second document comprise the first section of information to be updated by the update;
in response to receiving the update to the first section of information, simultaneously updating the first document and the second document to replace the first section of information of both the first document and the second document with an updated first section of information comprising updated text based on the update received to create an updated first document and an updated second document; and
determining to update the first document and the second document with the updated first section of information based on the first document and the second document being associated with the selection parameter.

8. The system of claim 7, wherein the first section of information is associated with a HyperText Markup Language (HTML) format; the second section of information and the third section of information are associated with at least one of a document (DOC) format, a Portable Document Format (PDF), or an EXCEL format; and the updated first document and the updated second document are associated with a JAVA server page format.

9. The system of claim 7, wherein simultaneously updating the first document and the second document occurs according to a schedule.

10. The system of claim 7, wherein the first section of information is stored in a database maintained by a table maintenance application.

11. The system of claim 7, wherein the memory comprises further instructions that, when executed by the processor, cause the processor to perform operations comprising:
determining that a third document comprises the first section of information; and
determining not to update the third document with the updated first section of information based on the third document not being associated with the selection parameter.

12. A non-transitory computer-readable storage medium for updating documents, having computer-executable instructions stored thereon that, when executed by a computer, cause the computer to perform operations comprising:
receiving an update to a first section of information, the update comprising changes to text of the first section of information;
determining that both a first document and a second document comprise the first section, wherein the first document further comprises a second section of information unique to the first document and the second document further comprises a third section of information unique to the second document;
receiving a selection parameter associated with the first document and the second document, the selection parameter indicating that the first document and the second document comprise the first section of information to be updated by the update;
in response to receiving the update to the first section of information, simultaneously updating the first document and the second document to replace the first section of information of both the first document and the second document with an updated first section of information comprising updated text based on the update received to create an updated first document and an updated second document; and
determining to update the first document and the second document with the updated first section of information based on the first document and the second document being associated with the selection parameter.

13. The computer-readable medium of claim 12, wherein the updated first section of information is associated with a first format; the second section of information and the third section of information are associated with a second format; and the updated first document and the updated second document are associated with a third format.

14. The computer-readable medium of claim 13, wherein the first format is at least one of a HyperText Markup Language (HTML) format or an Extensible Markup Language (XML) format; the second format is at least one of a document (DOC) format, a Portable Document Format (PDF), or an EXCEL format; and the third format is a JAVA server page format.

15. The computer-readable medium of claim 12, wherein simultaneously updating the first document and the second document occurs according to a schedule.

16. The computer-readable medium of claim 12, having further computer-executable instructions stored thereon that, when executed by a computer, causes the computer to perform operations comprising:
 determining that a third document comprises the first section of information; and
 determining not to update the third document with the updated first section of information based on the third document not being associated with the selection parameter.

* * * * *